(12) United States Patent
Chang et al.

(10) Patent No.: US 12,177,599 B2
(45) Date of Patent: Dec. 24, 2024

(54) IMAGE CAPTURING METHOD AND ELECTRONIC DEVICE

(71) Applicant: ASUSTeK COMPUTER INC., Taipei (TW)

(72) Inventors: Ting-Han Chang, Taipei (TW); ChunYen Liao, Taipei (TW); Ching Xsuan Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 220 days.

(21) Appl. No.: 17/873,179

(22) Filed: Jul. 26, 2022

(65) Prior Publication Data

US 2023/0042136 A1    Feb. 9, 2023

(30) Foreign Application Priority Data

Aug. 9, 2021    (TW) .................................. 110129306

(51) Int. Cl.
*H04N 5/262* (2006.01)
*H04N 5/91* (2006.01)
*H04N 23/695* (2023.01)

(52) U.S. Cl.
CPC ............. *H04N 5/2628* (2013.01); *H04N 5/91* (2013.01); *H04N 23/695* (2023.01)

(58) Field of Classification Search
CPC ...... H04N 5/2628; H04N 5/91; H04N 23/695; H04N 23/951; H04N 23/698
See application file for complete search history.

(56) References Cited

U.S. PATENT DOCUMENTS

| | | | |
|---|---|---|---|
| 10,713,828 | B2 | 7/2020 | Hiraga et al. |
| 2019/0045122 | A1* | 2/2019 | Chiaki ................... H04N 23/60 |
| 2020/0059595 | A1* | 2/2020 | Ono ........................ G06T 7/254 |

FOREIGN PATENT DOCUMENTS

| | | |
|---|---|---|
| CN | 107026973 | 8/2017 |
| CN | 107749944 | 3/2018 |
| CN | 108416825 | 8/2018 |
| CN | 109618092 | 11/2020 |

* cited by examiner

*Primary Examiner* — Christopher K Peterson
(74) *Attorney, Agent, or Firm* — JCIPRNET (57) ABSTRACT

An image capturing method, applicable to an electronic device including an image capturing device and a processor, is provided. The image capturing device has a field of view (FOV). The image capturing method includes: capturing a plurality of images of the FOV by using the image capturing device, and recording a plurality of images within a capture frame in the FOV from the images, where a capturing range of the capture frame is smaller than or equal to the FOV; moving the capture frame to a perspective-moving target within the FOV in response to a setting operation on the perspective-moving target; and generating a moving-perspective video from the recorded images.

12 Claims, 7 Drawing Sheets

IMAGE CAPTURING METHOD AND ELECTRONIC DEVICE

CROSS-REFERENCE TO RELATED APPLICATION

This application claims the priority benefit of Taiwan Application Serial No. 110129306, filed on Aug. 9, 2021. The entirety of the above-mentioned patent application is hereby incorporated by reference herein and made a part of specification.

BACKGROUND

Field of the Invention

The disclosure relates to an image capturing method, applicable to an electronic device.

Description of the Related Art

Built-in cameras of existing smart phones have fixed shooting angles of view. In particular, for a mobile phone without a built-in flip camera module, the mobile phone only shoots a fixed-perspective video if without an external device (such as a three-axis stabilizer) or being moved. After being shot, a fixed-perspective video still needs to be post-produced to become a video with a moving-perspective effect, resulting in a more cumbersome and inconvenient video production process.

SUMMARY

The disclosure provides an image capturing method, applicable to an electronic device including an image capturing device and a processor. The image capturing device has a field of view (FOV). The image capturing method includes: capturing a plurality of images of the FOV by using the image capturing device, and recording a plurality of images within a capture frame in the FOV from the images, where a capturing range of the capture frame is smaller than the FOV; moving the capture frame to a perspective-moving target within the FOV in response to a setting operation on the perspective-moving target; and generating a moving-perspective video from the recorded images.

The disclosure further provides an electronic device, including: an image capturing device, having an FOV; a storage device, storing a computer program; and a processor, coupled to the image capturing device and the storage device, and configured to load and execute the computer program to: capture a plurality of images of the FOV by using the image capturing device, and record a plurality of images within a capture frame in the FOV from the images, where a capturing range of the capture frame is smaller than or equal to the FOV; move the capture frame to a perspective-moving target within the FOV in response to a setting operation on the perspective-moving target; and generate a moving-perspective video from the recorded images.

Based on the above, by means of the image capturing method and the electronic device of the disclosure, an extra FOV of a camera is utilized, and images are captured and recorded by moving a capture frame within the FOV, to produce a video having a moving-perspective effect without moving a mobile phone or performing post-production. In this way, a user records a moving-perspective video conveniently and quickly even though a built-in camera of an electronic device only shoots fixed-perspective images.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Some embodiments of the disclosure are described in detail below with reference to the accompanying drawings. For reference numerals used in the following descriptions, same reference numerals in different accompanying drawings represent same or similar components. The embodiments are merely a part of the disclosure, and do not disclose all possible embodiments of the disclosure. More exactly, the embodiments are only examples of methods and devices in the scope of the claims of the disclosure.

Figure 1:
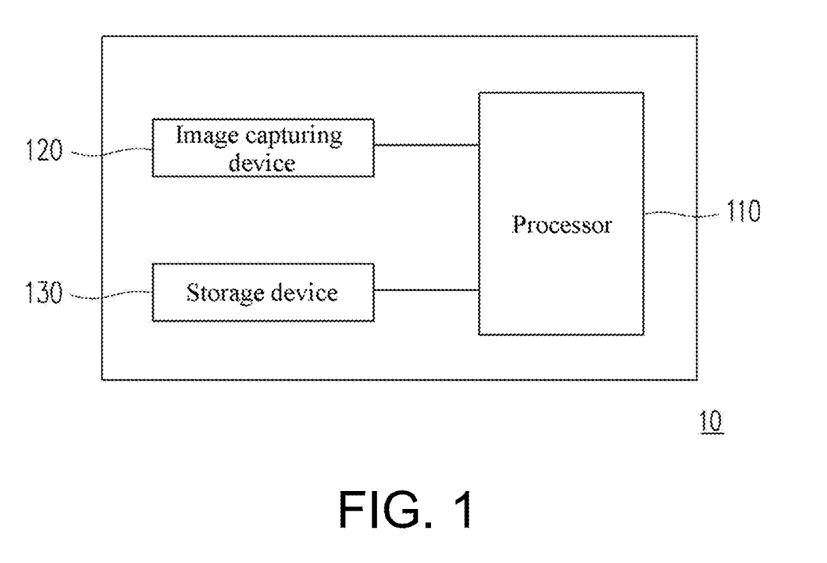
FIG. 1 is a block diagram of an electronic device according to an embodiment of the disclosure.

Referring to FIG. 1, an electronic device 10 includes a processor 110, an image capturing device 120, and a storage device 130. The processor 110 is coupled to the image capturing device 120 and the storage device 130. The image capturing device 120 includes an FOV. The storage device 130 stores a computer program.

The processor 110 is responsible for overall or partial operation of the electronic device 10. In an embodiment, the processor 110 is a central processing unit (CPU), or another programmable general-purpose or special-purpose micro control unit (MCU), a microprocessor, a digital signal processor (DSP), a programmable controller, an application-specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or another similar element, or a combination thereof.

In an embodiment, the image capturing device 120 is a digital camera, a video camera, or an imaging lens with a lens and a photosensitive element. The photosensitive element is used to sense the intensity of light entering the lens, to generate an image. The photosensitive element is a charge coupled device (CCD), a complementary mental-oxide semiconductor (CMOS) element, or another element.

The storage device 130 stores a computer program. In an embodiment, the storage device 130 is a fixed or removable random access memory (RAM) of any type, a read-only memory (ROM), a flash memory, a hard disk drive (HDD), a solid state drive (SSD), or a similar element, or a combination thereof. The storage device 130 is used to store a plurality of modules, computer programs, or various applications executable by the processor 110.

In an embodiment, the processor 110 captures a plurality of images of the FOV by using the image capturing device 120, and records a plurality of images within a capture frame in the FOV from the images, where a capturing range of the capture frame is smaller than or equal to the FOV. The processor 110 moves the capture frame to a perspective-moving target within the FOV in response to a setting operation on the perspective-moving target. The processor 110 generates a moving-perspective video from the recorded images.

Figure 2:
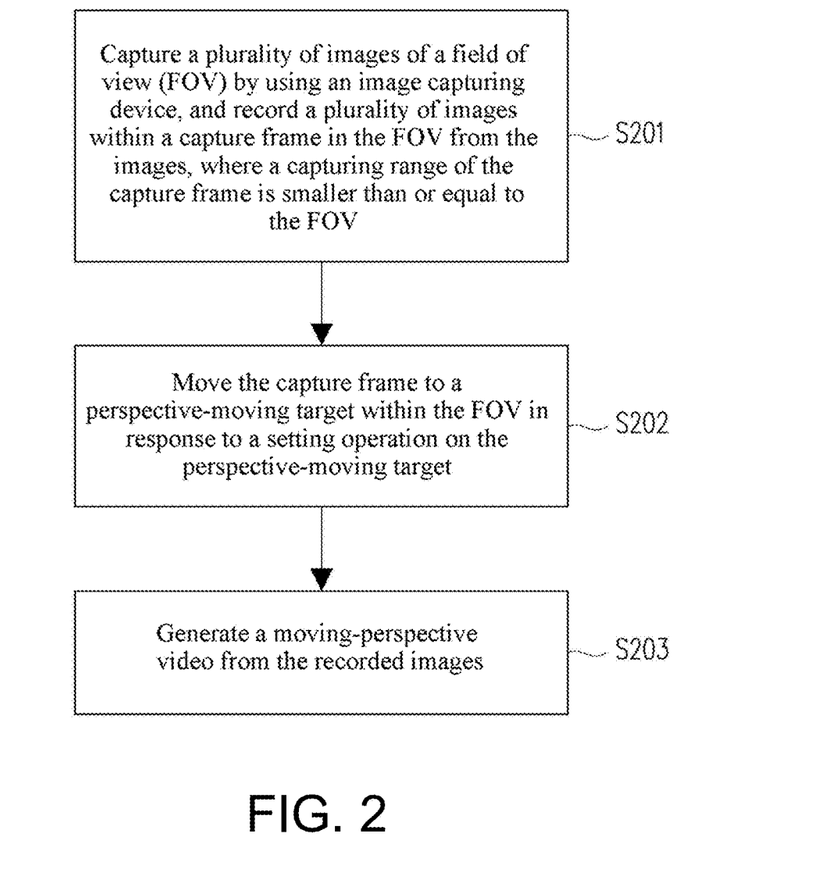
FIG. 2 is a flowchart of an image capturing method according to an embodiment of the disclosure.

Referring to FIG. 2, the method of this embodiment is applicable to the electronic device 10 shown in FIG. 1, and detailed steps of this embodiment of the disclosure are described below.

Step S201: The processor 110 captures a plurality of images of an FOV by using the image capturing device 120, and records a plurality of images within a capture frame in the FOV from the images, where a capturing range of the capture frame is smaller than or equal to the FOV. Step S202: The processor 110 moves the capture frame to a perspective-moving target within the FOV in response to a setting operation on the perspective-moving target. Step S203: The processor 110 generates a moving-perspective video from the recorded images.

Figure 3:
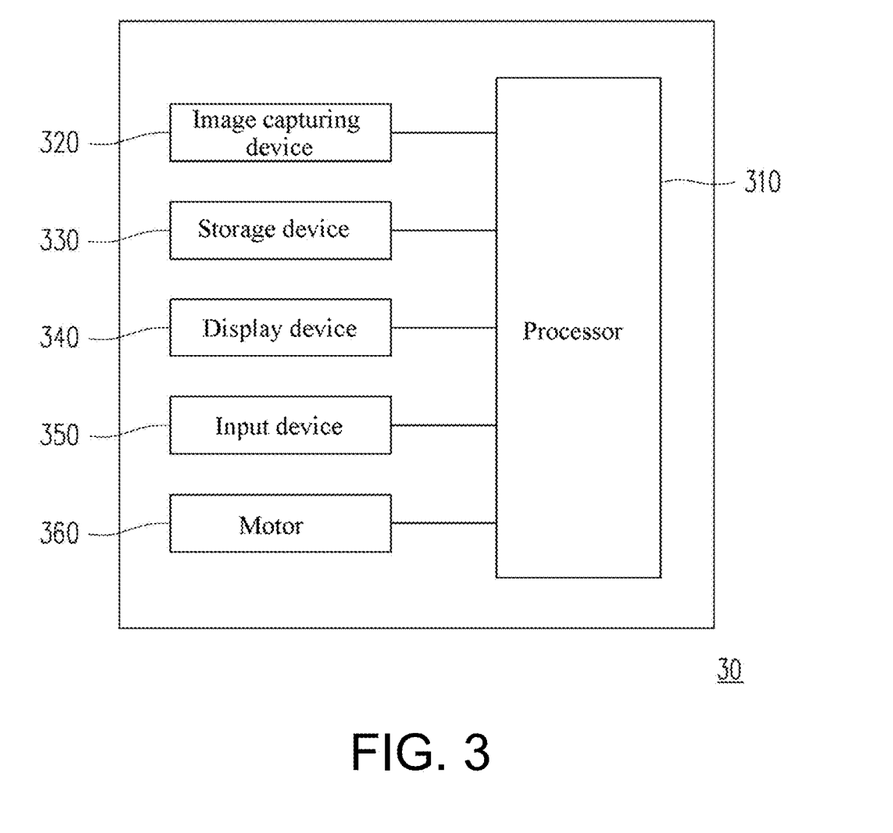
FIG. 3 is a block diagram of an electronic device according to another embodiment of the disclosure.

Referring to FIG. 3, an electronic device 30 includes a processor 310, an image capturing device 320, a storage device 330, a display device 340, an input device 350, and a motor 360. The processor 310 is coupled to the image capturing device 320, the storage device 330, the display device 340, the input device 350, and the motor 360.

The types and functions of the processor 310, the image capturing device 320, and the storage device 330 are the same as those of the processor 110, the image capturing device 120, and the storage device 130 in the foregoing embodiment. Therefore, details are not described herein again The display device 340 is a liquid crystal display (LCD), a light emitting diode (LED) display, an organic light emitting diode (OLED) display, a touch screen, or another type of display.

The input device 350 is a touch screen or an input interface such as a mouse, a keyboard, a sound control input mechanism, or a plurality of buttons with a plurality of options corresponding to the display device 340.

The motor 360 is a servo motor, a stepping motor, a magnetic levitation motor, a linear motor, or the like, and is configured to rotate the image capturing device 320.

In an embodiment, the processor 310 captures a plurality of images of an FOV by using an image capturing device 320, and records a plurality of images within a capture frame in the FOV from the images, where a capturing range of the capture frame is smaller than or equal to the FOV. The processor 310 moves the capture frame to a perspective-moving target within the FOV in response to a setting operation on the perspective-moving target. The processor 110 generates a moving-perspective video from the recorded images.

In an embodiment, the processor 310 moves the capture frame to the perspective-moving target within a set moving time.

In an embodiment, the processor 310 moves the capture frame to the perspective-moving target according to a set moving speed.

In an embodiment, the processor 310 displays the plurality of images of the FOV captured by the image capturing device 320 on the display device 340, and receives the setting operation on the perspective-moving target within the FOV by using the input device 350.

In an embodiment, the processor 310 rotates the image capturing device 320 by using the motor 360, to change the FOV of the image capturing device 320 to another FOV. During the rotation of the image capturing device 320, the processor 310 records, from the images of the FOV captured by the image capturing device 320 before the rotation, a plurality of images within the capture frame moving toward the perspective-moving target, and after the rotation of the image capturing device 320, records, from images of the another FOV captured by the image capturing device 320 after the rotation, a plurality of images within a second capture frame moving toward the perspective-moving target, where a start position of the second capture frame corresponds to an end position of the capture frame.

In an embodiment, the processor 310 adjusts the size of a capturing range of the capture frame in the process of moving the capture frame to the perspective-moving target.

In an embodiment, the processor 310 zooms the FOV of the image capturing device 320 in the process of moving the capture frame to the perspective-moving target.

Figure 4:
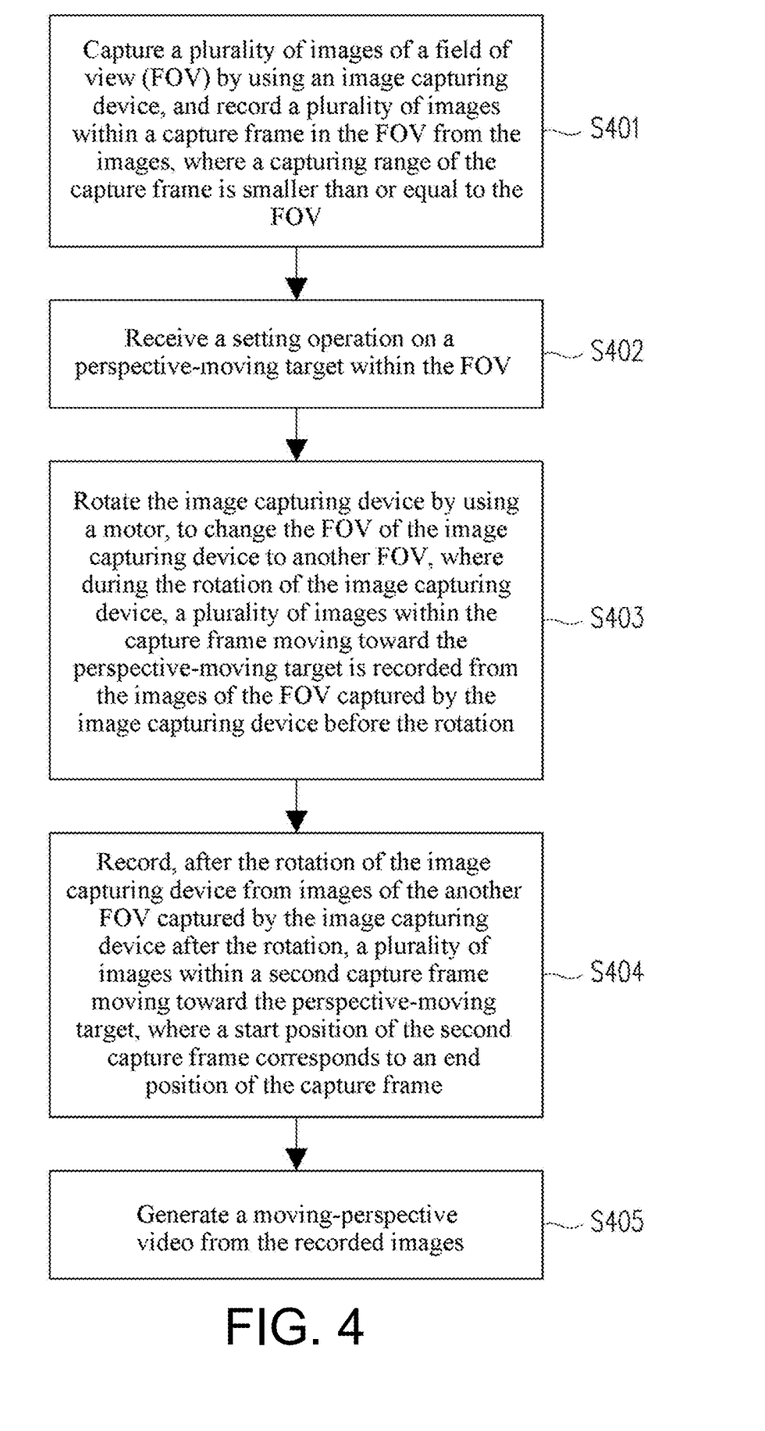
FIG. 4 is a flowchart of an image capturing method according to another embodiment of the disclosure.

Referring to FIG. 4, the method of this embodiment is applicable to the electronic device 30 shown in FIG. 3, and detailed steps of this embodiment of the disclosure are described below.

Step S401: The processor 310 captures a plurality of images of an FOV by using the image capturing device 320, and records a plurality of images within a capture frame in the FOV from the images, where a capturing range of the capture frame is smaller than or equal to the FOV. Step S402: The processor 310 receives a setting operation on a perspective-moving target within the FOV. Step S403: The processor 310 rotates the image capturing device 320 by using the motor 360, to change the FOV of the image capturing device 320 to another FOV. During the rotation of the image capturing device 320, the processor 310 records, from the images of the FOV captured by the image capturing device 320 before the rotation, a plurality of images within the capture frame moving toward the perspective-moving target. Step S404: After the rotation of the image capturing device 320, the processor 310 records, from images of the another FOV captured by the image capturing device 320 after the rotation, a plurality of images within a second capture frame moving toward the perspective-moving target. A start position of the second capture frame corresponds to an end position of the capture frame. Step S405: The processor 310 generates a moving-perspective video from the recorded images.

Figure 5:
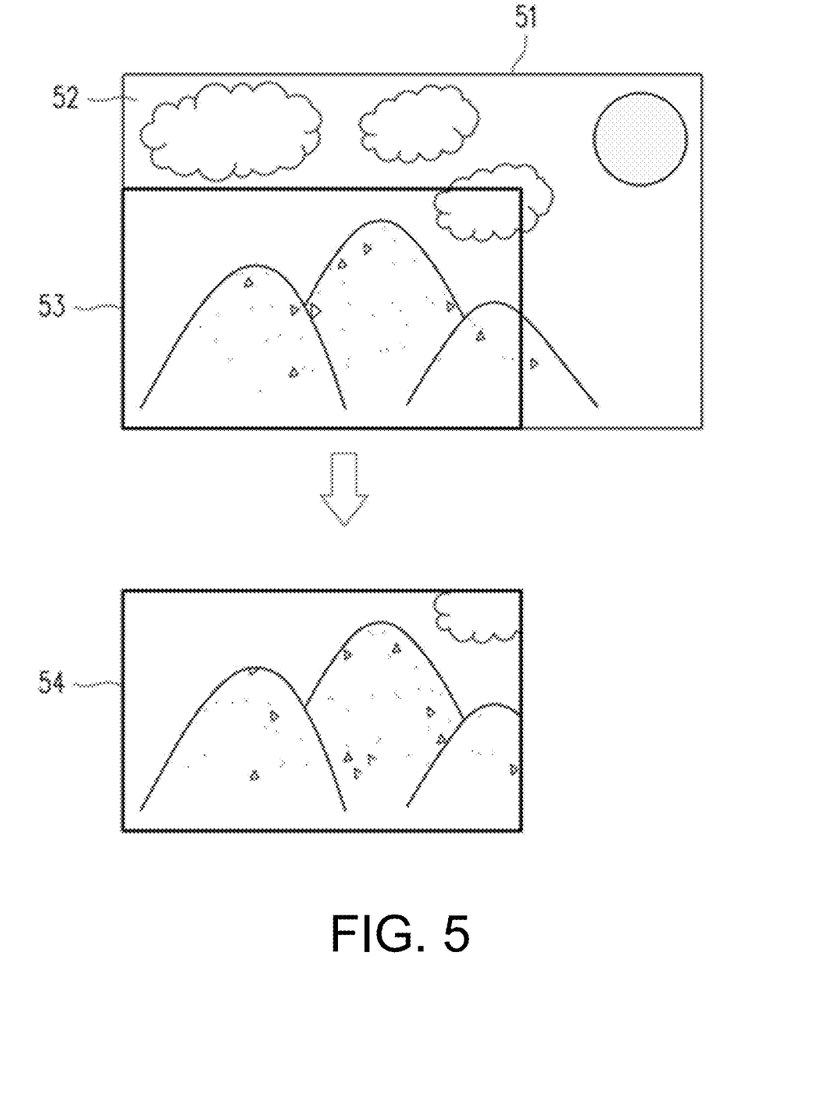
FIG. 5 is a schematic diagram of recording a plurality of images within a capture frame in an FOV according to an embodiment of the disclosure.

Referring to FIG. 5 and FIG. 3, the image capturing device 320 captures a plurality of images 52 within an FOV 51, and records a plurality of images 54 within a capture frame 53 in the FOV 51 from the images 52. As shown in FIG. 5, a capturing range of the capture frame 53 is smaller than or equal to the FOV 51.

Figure 6:
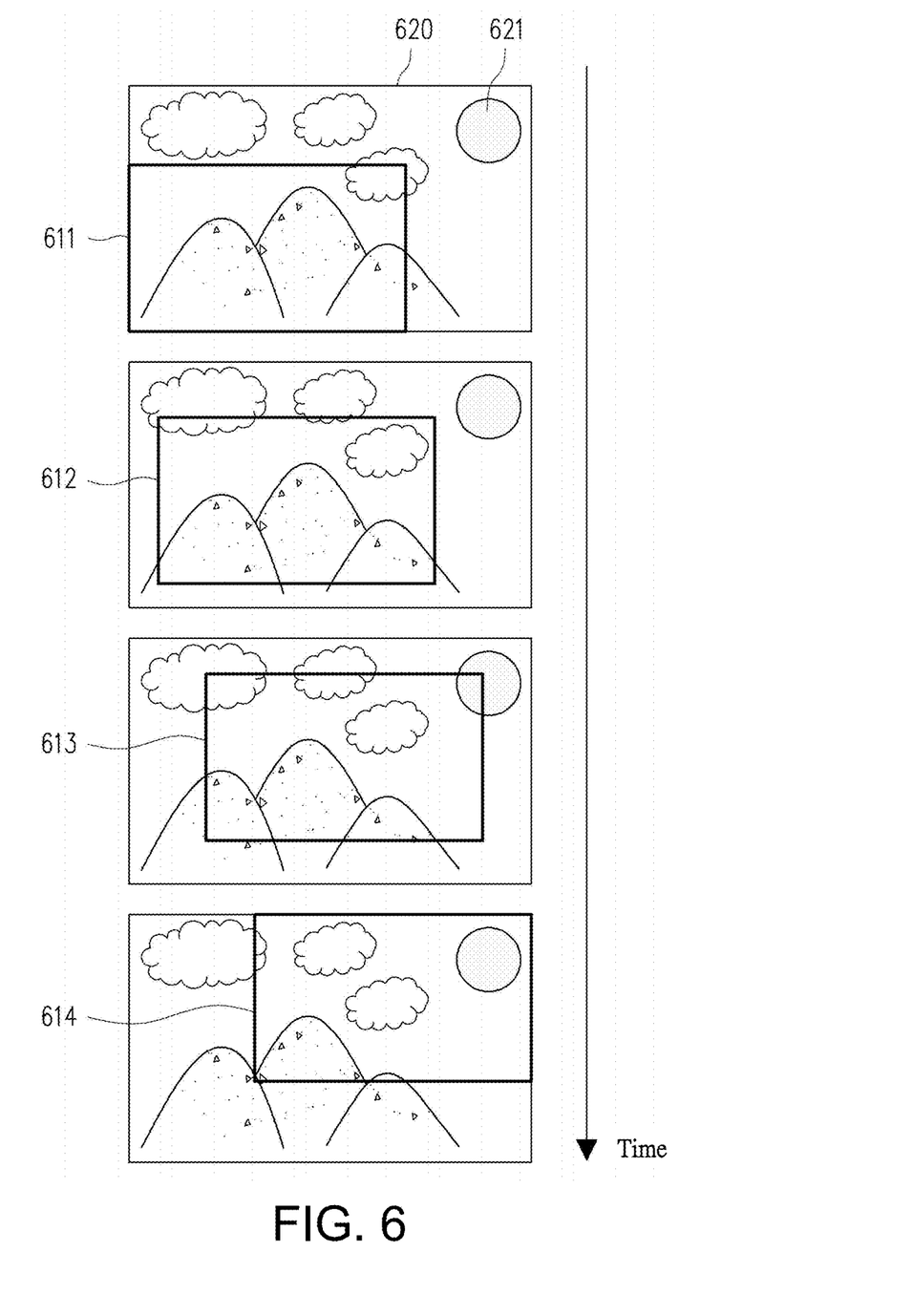
FIG. 6 is a schematic diagram of moving a capture frame to a perspective-moving target according to an embodiment of the disclosure.

Referring to FIG. 6 and FIG. 3, in FIG. 6, the processor 310 gradually moves a capture frame (capture frames 611, 612, 613, and 614 shown in the figure) to a perspective-moving target within an FOV 620 in response to a setting operation (in an embodiment, a user clicks or taps a target 621 in an upper right corner of the FOV 620 through an input device) on the perspective-moving target. The capture frames 611, 612, 613, and 614 respectively correspond to capturing ranges at different time points. In an embodiment, the capture frame 611 corresponds to a capturing range at the first second, the capture frame 612 corresponds to a capturing range at the second second, the capture frame 613 corresponds to a capturing range at the third second, and the capture frame 614 corresponds to a capturing range at the fourth second.

In an embodiment, the processor 310 moves the capture frame 611 to a perspective-moving target (as indicated by the capture frame 614) within a set moving time (such as T=4 seconds).

In an embodiment, the processor 310 moves the capture frame 611 to the perspective-moving target (as indicated by the capture frame 614) according to a set moving speed.

Specifically, the moving speed is calculated by using center point coordinates $(x_r, y_r)$ of the capture frame 611, center point coordinates of the capture frame 614, and a moving time T. In an embodiment, the moving speed is an X-coordinate moving speed $S_x=(x_g-x_r)/T$, or the moving speed is a Y-coordinate moving speed $S_y=(y_g-y_r)/T$. In this way, a formula for calculating the center point coordinates of the capture frame at every second is $(x_{rt}, y_{rt})=(x_r+S_x*T, y_r+S_y*T)$, and the center point coordinates $(x_{rt}, y_{rt})$ of the capture frame at every second are calculated. In the foregoing embodiment, the center point coordinates of the capture frames 611, 612, 613, and 614 are respectively calculated as $(x_{r1}, y_{r1})$, $(x_{r2}, x_{r2})$, $(x_{r3}, y_{r3})$ and $(x_{r4}, y_{r4})$ when T=4 seconds. Next, the processor 310 moves the capture frame 611 to a position of the capture frame 614 through an application interface.

It should be noted that, the motor 360 disposed on the electronic device 30 generally has a minimum rotation angle limit (in an embodiment, each time the motor 360 rotates, the motor 360 rotates by at least 9 degrees). In a video recording process, if the image capturing device 320 is rotated by the motor 360, the image capturing device 320 shakes a lot. Therefore, in an embodiment, during the rotation of the image capturing device 320, the electronic device 30 records a moving-perspective video by using the images of the FOV captured before the rotation, and continues recording, after the rotation, the moving-perspective video by using the images of the FOV captured after the rotation.

Figure 7:
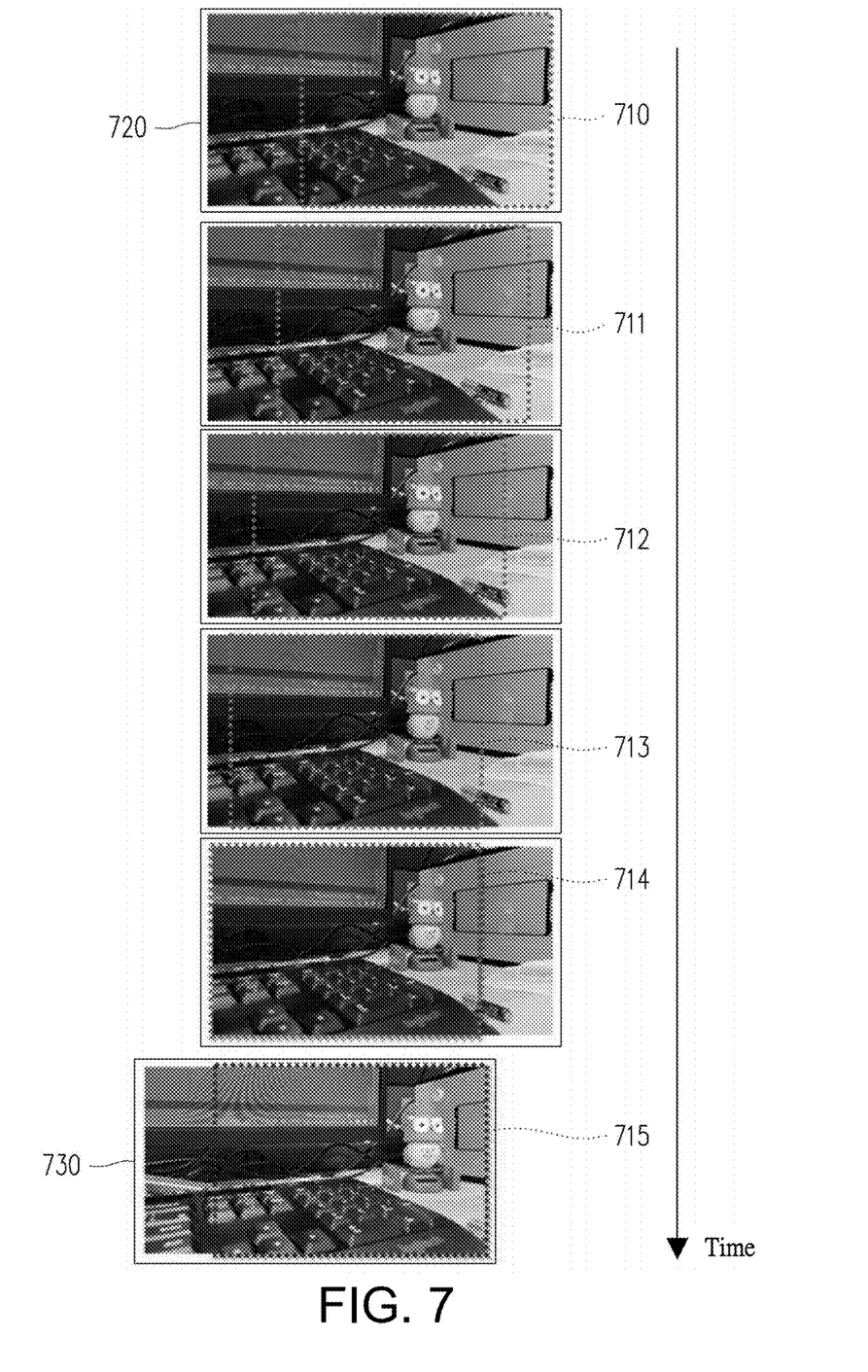
FIG. 7 is a schematic diagram of rotating an image capturing device with a motor to change an FOV of an image capturing device to another FOV according to another embodiment of the disclosure.

Referring to FIG. 7 and FIG. 3, as shown in FIG. 7, capture frames 710, 711, 712, 713, 714, and 715 respectively correspond to capturing ranges at different time points. In an embodiment, the capture frame 710 corresponds to a capturing range at the zeroth second, the capture frame 711 corresponds to a capturing range at the first second, the capture frame 712 corresponds to a capturing range at the second second, the capture frame 713 corresponds to a capturing range at the third second, the capture frame 714 corresponds to a capturing range at the fourth second, and the capture frame 715 corresponds to a capturing range at the fifth second. It should be noted that, in this embodiment, the capture frames 710, 711, 712, 713, and 714 fall within an FOV 720 of the image capturing device 320 before the motor 360 rotates the image capturing device 320, and the capture frame 715 falls within an FOV 730 of the image capturing device 320 after the motor 360 rotates the image capturing device 320.

Specifically, the processor 310 rotates the image capturing device 320 by using the motor 360, to change the FOV 720 of the image capturing device 320 to another FOV 730. In addition, during the rotation of the image capturing device 320, the processor 310 records, from images of the FOV 720 captured by the image capturing device 320 before the rotation, a plurality of images within the capture frame (the capture frame 710, 711, 712, 713, 714 shown in the figure) moving toward the perspective-moving target, and after the rotation of the image capturing device 320, records, from images of the FOV 730 captured by the image capturing device 320, a plurality of images within a second capture frame 715 moving toward the perspective-moving target. As shown in the figure, a start position of the second capture frame 715 corresponds to an end position of the capture frame 714.

In this embodiment, the plurality of images in the capture frames 710, 711, 712, 713, and 714 moving toward the perspective-moving target in the FOV 720 is recorded from the first second to the fourth second, so that the possible shaking of the recorded images is avoided when the motor 360 rotates the image capturing device 320. Next, the start position of the second capture frame 715 is made correspond to the end position of the capture frame 714 in the FOV 730 (that is, the FOV after the rotation of the motor 360) at the fifth second, so that the video recording process is continued. In an embodiment, image processing, such as smoothing, is performed on the images captured from the capture frame 714 and the images captured from the second capture frame 715, so that recording of the moving-perspective video is smoothly continued.

In summary, in the image capturing method and the electronic device of the disclosure, images are recorded by moving the capture frame within the images of the FOV captured by the image capturing device, to generate a video with a moving-perspective effect without moving a mobile phone or performing post-production. In addition, the image capturing device is rotated to change the FOV, and the capture frame is moved within the images captured before and after the rotation of the image capturing device to record images, so that the recorded images are prevented from being affected by the shaking of the image capturing device. In this way, a moving-perspective video is recorded conveniently and quickly even though a built-in camera of an electronic device only shoots fixed-perspective images.

Although the disclosure has been described with reference to the above embodiments, the embodiments are not intended to limit the present invention. A person of ordinary skill in the art may make variations and improvements without departing from the spirit and scope of the present invention. Therefore, the protection scope of the present invention should be subject to the appended claims.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing method, applicable to an electronic device comprising an image capturing device and a processor, wherein the image capturing device has a field of view (FOV), and the method comprises:

capturing a plurality of images of the FOV by using the image capturing device, and recording a plurality of images within a capture frame in the FOV from the images, wherein a capturing range of the capture frame is smaller than or equal to the FOV;

moving the capture frame to a perspective-moving target within the FOV in response to a setting operation on the perspective-moving target; and generating a moving-perspective video from the recorded images, wherein the electronic device further comprises a motor for rotating the image capturing device, and the step of moving the capture frame to the perspective-moving target comprises:

rotating the image capturing device by using the motor, to change the FOV of the image capturing device to another FOV, wherein during the rotation of the image capturing device, a plurality of images within the capture frame moving toward the perspective-moving target is recorded from the images of the FOV captured by the image capturing device before the rotation, and after the rotation of the image capturing device, a plurality of images within a second capture frame moving toward the perspective-moving target is recorded from images of the another FOV captured by the image capturing device after the rotation, wherein a start position of the second capture frame corresponds to an end position of the capture frame.

2. The image capturing method according to claim 1, wherein the step of moving the capture frame to the perspective-moving target comprises:

moving the capture frame to the perspective-moving target within a set moving time.

3. The image capturing method according to claim 1, wherein the step of moving the capture frame to the perspective-moving target comprises:

moving the capture frame to the perspective-moving target according to a set moving speed.

4. The image capturing method according to claim 1, further comprising:

displaying the plurality of images of the FOV captured by the image capturing device, to receive the setting operation on the perspective-moving target within the FOV.

5. The image capturing method according to claim 1, further comprising:

adjusting the size of a capturing range of the capture frame in the process of moving the capture frame to the perspective-moving target.

6. The image capturing method according to claim 1, further comprising:

zooming the FOV of the image capturing device in the process of moving the capture frame to the perspective-moving target.

7. An electronic device, comprising:

an image capturing device, having a field of view (FOV);

a storage device, storing a computer program;

a motor, coupled to the processor, and configured to rotate the image capturing device; and a processor, coupled to the image capturing device and the storage device, and configured to load and execute the computer program to:

capture a plurality of images of the FOV by using the image capturing device, and record a plurality of images within a capture frame in the FOV from the images, wherein a capturing range of the capture frame is smaller than or equal to the FOV;

move the capture frame to a perspective-moving target within the FOV in response to a setting operation on the perspective-moving target; and generate a moving-perspective video from the recorded images, wherein the processor is further configured to:

rotate the image capturing device by using the motor, to change the FOV of the image capturing device to another FOV, wherein during the rotation of the image capturing device, a plurality of images within the capture frame moving toward the perspective-moving target is recorded from the images of the FOV captured by the image capturing device before the rotation, and after the rotation of the image capturing device, a plurality of images within a second capture frame moving toward the perspective-moving target is recorded from images of the another FOV captured by the image capturing device after the rotation, wherein a start position of the second capture frame corresponds to an end position of the capture frame.

8. The electronic device according to claim 7, wherein the processor is further configured to:

move the capture frame to the perspective-moving target within a set moving time.

9. The electronic device according to claim 7, wherein the processor is further configured to:

move the capture frame to the perspective-moving target according to a set moving speed.

10. The electronic device according to claim 7, further comprising:

a display device and an input device, coupled to the processor respectively, wherein the processor is further configured to:

display the plurality of images of the FOV captured by the image capturing device on the display device, and receive the setting operation on the perspective-moving target within the FOV by using the input device.

11. The electronic device according to claim 7, wherein the processor is further configured to:

adjust the size of a capturing range of the capture frame in the process of moving the capture frame to the perspective-moving target.

12. The electronic device according to claim 7, wherein the processor is further configured to:

zoom the FOV of the image capturing device in the process of moving the capture frame to the perspective-moving target.

* * * * *